2,572,259

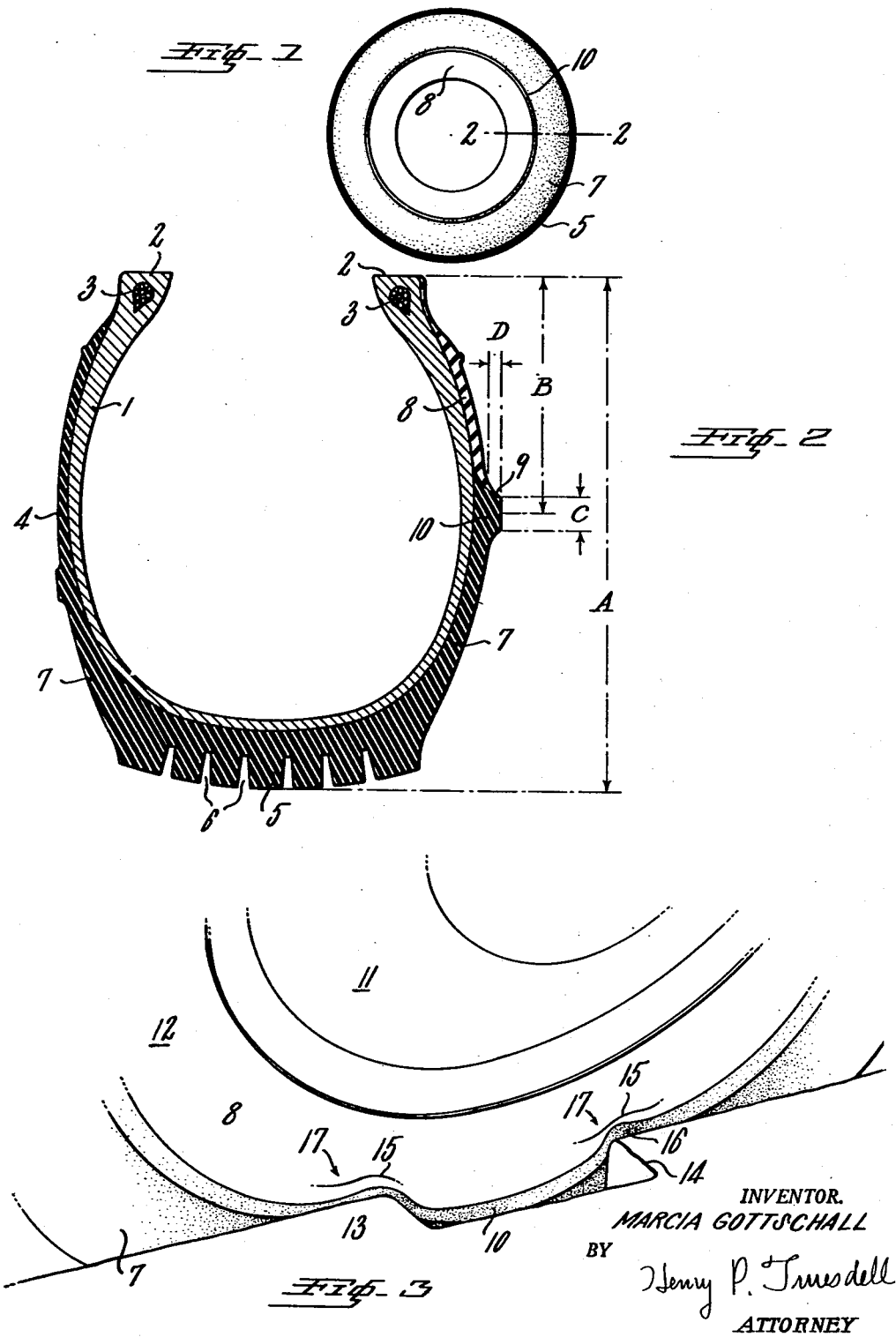
Oct. 23, 1951 — M. GOTTSCHALL — 2,572,259
WHITE SIDE WALL TIRE
Filed Sept. 14, 1949
INVENTOR.
MARCIA GOTTSCHALL Patented Oct. 23, 1951

UNITED STATES PATENT OFFICE 2,572,259

WHITE SIDE WALL TIRE

Marcia Gottschall, Detroit, Mich., assignor to United States Rubber Company, New York, N. Y., a corporation of New Jersey Application September 14, 1949, Serial No. 115,656

5 Claims. (Cl. 152—353)

This invention relates to an improved pneumatic tire, and in particular, it relates to an improved white side wall tire having means for protecting the white side wall for discoloration or injury.

In conventional white side wall tires, considerable difficulty is ordinarily encountered because of the susceptibility of the white portion to scuffing or bruising against the curb or ruts in the road. For example, in parking an automobile with white side wall tires, great care must be taken to prevent the tire side wall from contacting the curb, because such contact produces undesirable abrasion and leaves an unsightly mark on the white side wall which spoils the appearance of the tire and which can be removed only with great difficulty, such as by prolonged vigorous scrubbing. This susceptibility of the white side wall to accidental scuffing makes it difficult to maintain the appearance of the tire and limits the usefulness of the tire for the purpose for which the white side wall is primarily intended, namely, attractive and distinctive appearance. This scuffing of the white side wall of the conventional tire frequently soils the face of such wall almost to the tire bead.

I have now discovered that scuffing of the white side wall against the curb or other obstacles can be substantially eliminated by providing a protecting projecting circumferential rib so proportioned and located as to obtain maximum width of the white area in combination with adequate protection of that area from the curb.

It is therefore a principal object of the present invention to provide a white side wall tire that is not readily susceptible to scuffing of the white portion.

Another object is the provision of protective means for preventing the white side wall from contacting the curb.

These and other advantages of the invention appear more fully in the following detailed description when considered in connection with the accompanying drawing, in which Fig. 1 is a side elevation of a white side wall tire embodying the features of my invention;

Fig. 2 is an enlarged transverse section of the tire taken along the line 2—2 of Fig. 1; and Fig. 3 is a perspective fragmentary view of an automobile wheel having the tire of the present invention mounted thereon, and illustrating the protection of the side wall from scuffing against the curb.

Referring to Figs. 1 and 2 of the drawing, the embodiment of my invention shown therein comprises a pneumatic tire having a carcass 1, bead portions 2 containing inextensible bead elements 3, a side wall portion 4, and a tread portion 5, which commonly has an anti-skid configuration formed therein such as the configuration defined by circumferential grooves 6.

The tread portion 5 is a carbon black reinforced stock designed particularly to resist abrasion, and the portion 7 of the side wall 4 extending from the tread portion 5 is also made of a carbon black reinforced stock, but usually differs in composition from the stock of the tread 5 in that it is particularly designed to be softer and more pliable than the tread stock.

The inner circumferential area of one side wall is provided with a zone of white stock in the form of a relatively thin veneer 8 of white rubber stock overlying the carcass portion 1. At its outer circumference 9, the white strip 8 merges with a circumferential rib, or projecting strip 10, of black rubber stock. The circumferential rib 10 is so disposed and proportioned with respect to the other elements of the tire that force exerted against the rib, occasioned by scuffing of the rib against an obstacle, such as a curb or a rut in the road, causes the white zone 8 to fold or bend inwardly away from the obstacle, due to the fact that displacement of the rib inwardly carries with it the adjacent white side wall. In this way, the rib 10 exerts a protective action on the white side wall 8, so that the susceptibility of the white portion to injury is greatly reduced and the appearance and serviceability of the tire is enhanced. The projecting strip 10, being made of black rubber stock, is itself relatively unsusceptible to discoloration from the curb.

In order to produce the foregoing protective action, I have found that the circumferential strip 10 should be so located on the side wall of the tire that the distance from the base of the bead portion 2 of the tire to the center line of the projecting strip, as represented by distance B in the drawing, is from 40% to 48% of the total distance from the plane of the top of the crown to the base of the bead portion 2, as represented by distance A in the drawing, the said distances being measured when the tire is uninflated and unloaded. The center line of the protective rib or strip 10 preferably substantially coincides with that portion of the side wall which is located a maximum distance from the vertical center line of the tire, that is, in the area of the outermost portion on the normal side wall curve. The width of the rib 10 along the side wall, represented by distance C in the drawing, is preferably from 5% to 8% of distance A, while the thickness of the rib, that is, the distance which the rib projects from the normal outer side wall curve, as represented by distance D in the drawing should be from 2% to 4% of distance A. As a corollary, the vertical distance from the outer circumference 9 of the white portion 8 to the rim is preferably 38% to 44% of distance A. When the foregoing conditions obtain, the described protective function is performed with a maximum of effectiveness.

The protective action of the rib 10 is illustrated in Fig. 3, wherein a wheel 11 is shown having a tire 12 constructed according to the present invention. The tire 12 has been driven up against the curb 13, part of which has been cut away at 14 to illustrate better the protective action of the rib 10. It will be noted that the rib 10 has caused the white side wall 8 to bulge inwardly at 15 away from the edge of the curb. The manner in which the black rib 10 is displaced upwardly and inwardly by the edge of the curb 10 is indicated most clearly at 16. Ordinarily, driving a conventional tire against the curb in this manner would produce extreme scuffing along the white portion at 17.

My invention therefore provides for substantially increasing the utility of white side wall tires by providing a unique disposition of the white portion and a protective rib, whereby the white portion is protected from injury which commonly makes maintenance of the attractive appearance of the tire a difficult and troublesome undertaking. The protective strip or rib is made of black stock and is therefore capable of bearing accidental scuffing without appreciable damage. Such wear as does occur on the protective ridge or rib due to scuffing is without effect on the over-all strength of the tire, since the rib represents additional thickness superimposed upon the normal tire side wall thickness. In a particularly advantageous form of the invention, the protective strip is compounded of rubber stock which is particularly designed to resist abrasion. Such rubber stocks are well known to those skilled in the art. The protective rib is easily provided on the tire without any special manufacturing operations. When proportioned and disposed as described the projecting circumferential rib cooperates with the white side wall to perform a highly effective protective action thereon, producing a white side wall tire of enhanced usefulness because of the relative ease with which the white wall is kept clean and neat, compared to conventional white side wall tires.

Because of the unique disposition of the projecting protective strip and the white side wall, there is relatively less wear of the white side wall due to scuffing, compared to conventional tires, and therefore the thickness of the white portion may be made less than has heretofore been found possible, without danger of the white portion becoming worn through, exposing the underlying black stock, in normal use.

The decrease in scuffing and wear of the white side wall resulting from the present construction also minimizes the danger of exposing the internal portion of the white stock, which may be discolored due to "bleeding" of compounding ingredients from the black stock into the white portion adjacent thereto. Therefore the construction of the present invention makes it unnecessary to employ a special non-bleeding type of black carcass rubber for the main underlying body of the side wall. Instead, it is usually sufficient to apply only a relatively thin layer of non-bleeding stock between the white wall and the main body of the tire carcass. This reduces the expense of the tire and simplifies the manufacturing operations.

Having thus described my invention, what I claim and desire to protect by Letters Patent is:

1. A pneumatic tire comprising tread, bead and side wall portions, at least one of said side wall portions being provided with an outwardly projecting rib extending circumferentially around the tire adapted to engage obstacles encountered by said side wall, the surface of said side wall from said rib to the tread being formed of relatively dark material, said side wall having a substantially white zone extending from said rib with the inner circumference thereof terminating adjacent said bead portion, said rib being located in the area of the maximum transverse diameter of the tire with the outer surface thereof constituting the outermost portion of said side wall, said rib having a width of from 5% to 8% and a thickness of at least 2% of the radial distance between the base of said bead portion and the plane of the top of the crown of the tread, whereby forces against said rib resulting from scuffing or lateral engagement with an obstacle cause said white zone to curve or bend inwardly from the obstacle.

2. A pneumatic tire comprising tread, bead, and side wall portions, at least one of said side wall portions being provided with a circumferential rib of relatively dark material projecting outwardly therefrom, the surface of said side wall from said rib to the tread being formed of relatively dark material, said side wall having a substantially white zone extending from said rib to adjacent the bead portion, said rib being located in the area of the maximum transverse diameter of the tire with the outer surface thereof constituting the outermost portion of said side wall, the center line of said rib being spaced from the adjacent bead portion a distance equal to from 40% to 48% of the radial distance between the base of said bead portion and the plane of the top of the crown of said tread, said rib having a width of from 5% to 8% and a thickness of at least 2% of the radial distance between the base of said bead portion and the plane of the top of the crown of the tread, said rib adapted upon scuffing or lateral engagement with a curb or the like to displace said white zone relative to said obstacle thereby protecting said white zone against injury and discoloration.

3. A pneumatic tire comprising tread, bead, and side wall portions, at least one of said side wall portions being provided with a circumferential rib projecting outwardly therefrom, the surface of said side wall from said rib to the tread being formed of relatively dark material, said side wall having a substantially white zone extending from said rib to adjacent the bead portion, said rib being located in the area of the maximum transverse diameter of the tire with the outer surface thereof constituting the outermost portion of said side wall, the outer circumference of said white zone being spaced from the adjacent bead portion a distance equal to from 38% to 44% of the radial distance between the base of said bead portion and the plane of the top of the crown of said tread, said rib having a width of from 5% to 8% and a thickness of at least 2% of the radial distance between the base of said bead portion and the plane of the top of the crown of said tread, said rib adapted upon scuffing or lateral engagement with an obstacle to displace said white zone and prevent its contact with said obstacle.

4. A pneumatic tire comprising tread, bead, and side wall portions, at least one of said side wall portions being provided with an outwardly projecting rib extending circumferentially around the tire adapted to engage obstacles encountered by said side wall, said rib and the side wall between said rib and tread portion being formed of relatively dark material, said side wall having a substantially white zone extending from said rib to adjacent the bead portion, said rib being located in the area of the maximum transverse diameter of the tire with the outer surface thereof constituting the outermost portion of said side wall, said rib having a width of from 5% to 8% and a thickness of from 2% to 4% of the radial distance between the base of said bead portion and the plane of the top of the crown of the tread, said rib adapted upon scuffing or lateral engagement with an obstacle to cause said white zone to curve or bend inwardly away from the obstacle.

5. A pneumatic tire comprising tread, bead, and side wall portions, at least one of said side wall portions being provided with a projecting rib of relatively dark material extending circumferentially around the tire adapted to initially engage obstacles encountered by said side wall, said side wall from said rib to the tread being also formed of relatively dark material, said side wall having a substantially white zone extending from the contiguous edge of said rib to adjacent the bead portion, said rib being located in the area of the maximum transverse diameter of the tire with the outer surface thereof constituting the outermost portion of said side wall, the center line of said rib being spaced from the adjacent bead portion a distance equal to from 40% to 48% of the radial distance between the base of said bead portion and the plane of the top of the crown of said tread, said rib having a width of approximately from 5% to 8% and a thickness of approximately 2% of the radial distance between the base of said bead portion and the plane of the top of the crown of the tread, said rib adapted upon severe scuffing or lateral engagement with an obstacle to displace said white zone relative to said obstacle thereby protecting said white zone against injury and discoloration.

MARCIA GOTTSCHALL.

REFERENCES CITED

The following references are of record in the file of this patent:

UNITED STATES PATENTS

| Number | Name | Date |
|---|---|---|
| D. 128,632 | Lee | Aug. 5, 1941 |
| 1,448,286 | Comstock | Mar. 13, 1923 |
| 1,458,629 | Raymond | June 12, 1923 |
| 1,726,026 | Hower | Aug. 27, 1929 |
| 1,940,077 | Coe | Dec. 19, 1933 |
| 2,130,594 | Mooradian | Sept. 20, 1938 |
| 2,199,466 | McRaven | May 7, 1940 |
| 2,240,856 | Phillips | May 6, 1941 |

FOREIGN PATENTS

| Number | Country | Date |
|---|---|---|
| 320,721 | Great Britain | Oct. 24, 1929 |